Figure 1:
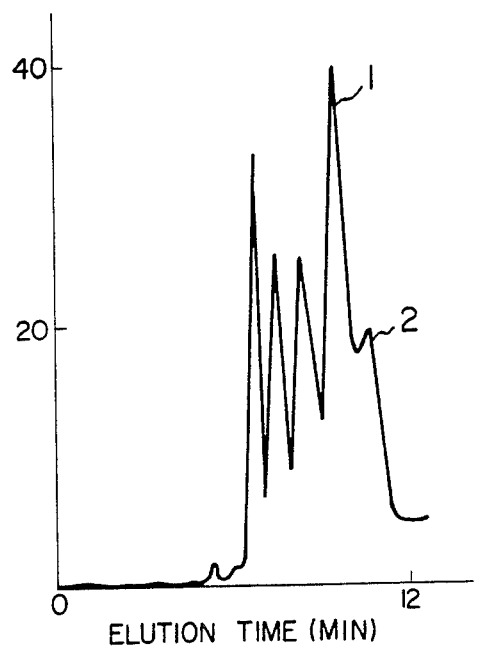

United States Patent [19]

Hirai et al.

[11] Patent Number: 4,486,308
[45] Date of Patent: Dec. 4, 1984

[54] COLUMN PACKING MATERIAL AND PRODUCTION THEREOF

[75] Inventors: Osamu Hirai; Tetsuya Aoyama; Yoshiyuki Mukoyama, all of Hitachi, Japan

[73] Assignee: Hitachi Chemical Company, Ltd., Tokyo, Japan

[21] Appl. No.: 533,581

[22] Filed: Sep. 19, 1983

[30] Foreign Application Priority Data

Sep. 24, 1982 [JP] Japan ................................ 57-167362

[51] Int. Cl.³ ............................................ B01D 15/08
[52] U.S. Cl. .................................. 210/502.1; 127/40; 210/198.2; 210/635; 521/52
[58] Field of Search ...................... 210/635, 656, 198.2, 210/502.1; 127/24, 40, 55, 46.1; 521/52

[56] References Cited

U.S. PATENT DOCUMENTS 3,095,329 6/1963 Giesen et al. ...................... 127/46.1
3,966,489 6/1976 Barrett et al. ...................... 127/46.1

OTHER PUBLICATIONS

Rainin Liquid Chromatography Catalog, Rainin Instrument Co., Woburn, Ma., p. 20, 1982.

Primary Examiner—John Adee
Attorney, Agent, or Firm—Antonelli, Terry & Wands

[57] ABSTRACT

Porous styrene-divinylbenzene copolymer particles having $SO_3^-$ groups and counter ions for $SO_3^-$ groups, said counter ions being (a) at least one of $Ca^{++}$ and $Sr^{++}$ and (b) at least one of $Pb^{++}$ and $Ba^{++}$ and the equivalent ratio of (a)/(b) being 1/2 to 2/1, are an excellent liquid chromatographic column packing material suited for separating sugars different in kind but the same in molecular weight.

3 Claims, 5 Drawing Figures

ELUTION TIME (MIN)

COLUMN PACKING MATERIAL AND PRODUCTION THEREOF

This invention relates to a novel liquid chromatographic column packing material suited for separating sugars different in kind but the same in molecular weight, and a process for producing such packing material.

The following methods are known for analyzing sugars according to liquid chromatography: (1) partition type separation by using a packing material (such as diethylaminoethyl cellulose) in which amino groups or other groups are chemically bonded; (2) separation by molecular sieve using a crosslinked dextrane gel or the like; (3) separation in the form of boric acid complex ions by using an anion exchange resin; and (4) separation by a combination of molecular sieve and partition technique by using a salt type cation exchange resin. Among these methods, (2) and (4) are easy to perform since water is used as eluent. However, the method (2) is incapable of separating different kinds of sugars having the same molecular weight, while the method (4) has a limitation to its capacity of separating such sugars.

In the course of the study on the columns for separating sugars (such as glucose, galactose, mannose, fructose, etc.) having the same molecular weight by using a cation exchange resin while using water as eluent, the present inventors found that the elution time varies from one kind of sugar to the other when the counter ion of the $SO_3^-$ group of the cation exchange resin is changed. It was also found that such phenomenon becomes more remarkable in the case of divalent cation. However, even when such divalent cation was used singly as the counter ion of the $SO_3^-$ group, it was impossible to separate the following four different sugars: glucose, galactose, mannose and fructose. For example, in case of using $Ca^{2+}$ or $Sr^{2+}$ as the counter ion of the $SO_3^-$ group, although glucose, galactose and fructose could be separated, galactose and mannose could not be separated from each other owing to their very close sites of elution. Also, in case of using $Pb^{2+}$ or $Ba^{2+}$ as the counter ion of the $SO_3^-$ group, glucose, galactose and fructose could be separated but mannose and fructose could not be separated from each other due to their close sites of elution.

Further researches were made by the present inventors with the above-said previous results in mind to finally achieve the present invention.

The present invention provides a liquid chromatographic column packing material comprising porous styrene-divinylbenzene copolymer particles, said copolymer having a $SO_3^-$ group and also containing as its counter ion:

(a) at least one kind of ion selected from the group consisting of $Ca^{++}$ and $Sr^{++}$, and (b) at least one kind of ion selected from the group consisting of $Pb^{++}$ and $Ba^{++}$, the (a)/(b) equivalent ratio being in the range from ½ to 2/1.

The present invention also provides a process for producing a liquid chromatographic column packing material which comprises neutralizing sulfonated porous styrenedivinylbenzene copolymer particles with an aqueous solution in which:

(c) at least one compound selected from the group consisting of $Ca(OH)_2$ and $Sr(OH)_2$, and (d) at least one compound selected from the group consisting of $Pb(OH)_2$ and $Sr(OH)_2$ are dissolved in a (c)/(d) molar ratio of from ½ to 2/1.

Figure 2:
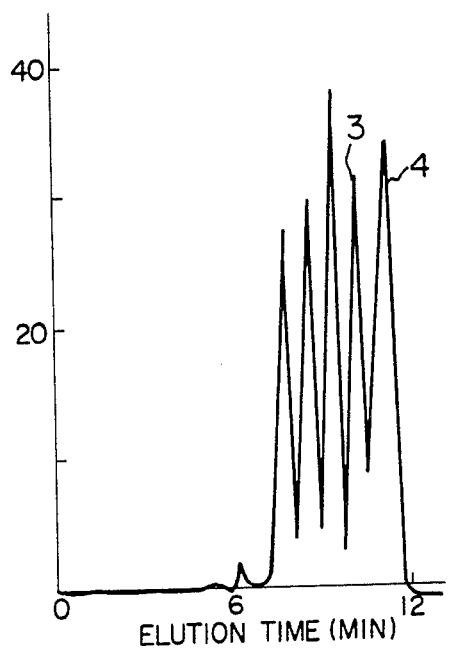
Figure 3:
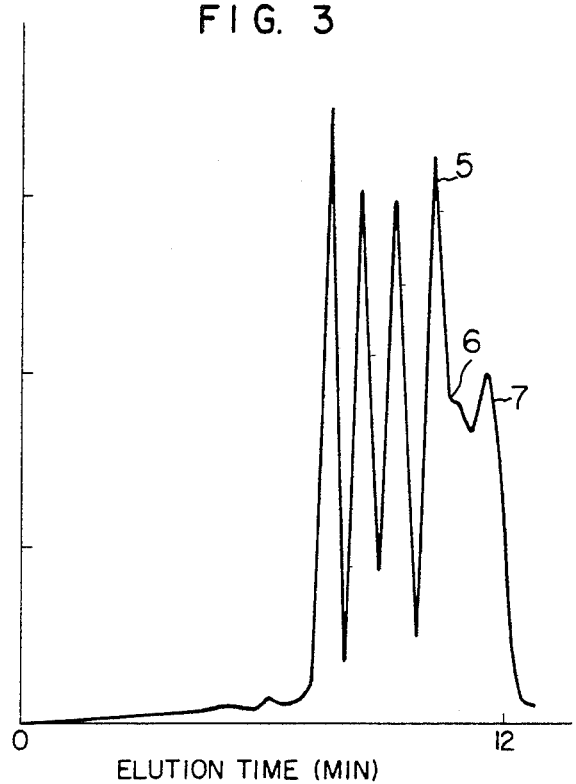
Figure 4:
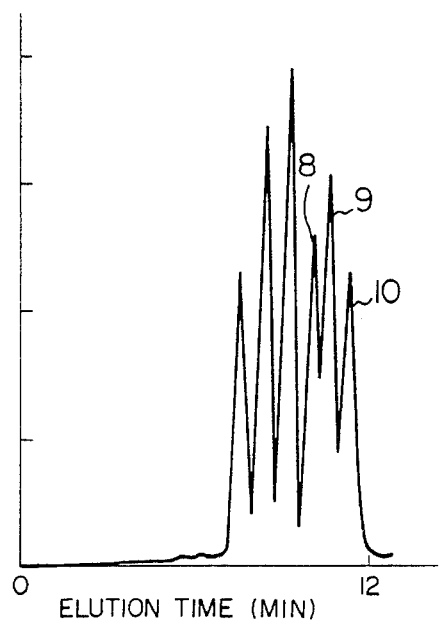
Figure 5:
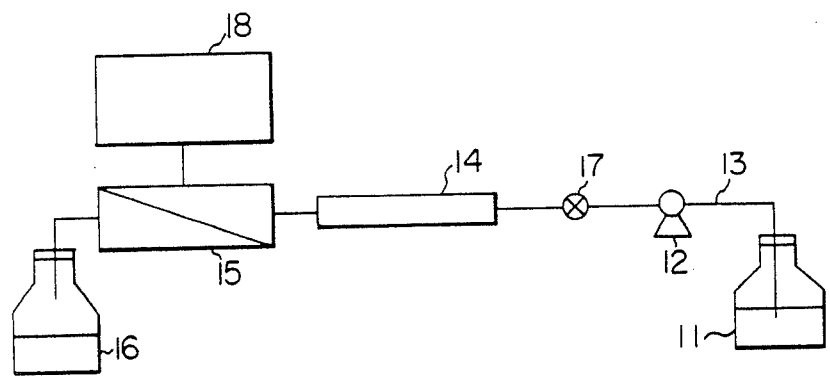

In the accompanying drawings, FIG. 1 is a chromatogram illustrating the results from Comparative Example 1; FIG. 2 is a chromatogram illustrating the results from Comparative Example 2; FIG. 3 is a chromatogram illustrating the results from Example 1; FIG. 4 is a chromatogram illustrating the results from Example 2; and FIG. 5 is a diagrammatic illustration of an analyzer used in the Examples and the Comparative Examples.

The column packing material according to this invention contains as the counter ions of the $SO_3^-$ group (a) $Ca^{++}$ or $Sr^{++}$ and (b) $Pb^{++}$ or $Ba^{++}$ in an (a)/(b) equivalent ratio of from ½ to 2/1. If such ion content is outside the said range, it is found difficult to separate, for example, galactose, mannose and fructose of the same molecular weight. Preferably, the (a)/(b) ratio is almost 1/1 (in equivalent ratio).

In case $Ca^{++}$ or $Sr^{++}$ (ion (a)) alone is contained as the counter ion of the $SO_3^-$ group, the separation between galactose and mannose is poorly made although a good separation can be attained between mannose and fructose, and in case $Pb^{++}$ or $Ba^{++}$ (ion(b)) alone is contained as the counter ion, the mannose/fructose separation is poor although galactose and mannose can be separated well. The column packing material according to this invention enables a definite separation of mannose, fructose and galactose, as said packing material contains both ions (a) and (b) in a proper ratio as the counter ions.

The column packing material of this invention preferably contains the $SO_3^-$ group in an amount of 2 milliequivalents per 1 g of the packing material (2 meq/g), most preferably in an amount of 3 to 5 meq/g. If the content of said group is less than 2 meq/g, the packing material may not be provided with a desired hydrophilicity. It is also desirable in respect of separating performance that the packing material is substantially free of $SO_3H$ group or such $SO_3H$ group which has been neutralized with an inorganic cation other than the above-said one. The term "substantially free" means that the $SO_3H$ group or its neutralized group is not detected in the neutralization titration or other testing of the packing material.

The particle size of the column packing material of this invention is preferably in the range from 1 to 20 μm in use for liquid chromatographic analysis and in the range from 20 to 300 μm in use for liquid chromatographic fractionation.

As for the degree of pores of the column packing material of this invention, there is no particular limit thereto, but it is desirable to regulate them such that the exclusive limit will be in the range of $400 - 1 \times 10^7$.

Said $SO_3^-$ group is bonded to the styrene-divinylbenzene copolymer which is a copolymer of divinylbenzene and a styrene monomer and in which divinylbenzene is contained preferably in an amount of 5 to 60% by weight. Examples of said styrene monomer are styrene, ethylmonovinylbenzene, vinyltoluene, toluene, α-methyl styrene and the like. Other types of monomer such as vinyl acetate, methacrylic acid, acrylic acid and the like may be used in an amount not greater than 5% by weight. The styrene-divinylbenzene copolymer takes the form of porous particles.

The column packing material according to this invention can be obtained by first preparing an aqueous solution by properly dissolving a hydroxide of the ion (a), e.g., Ca(OH)$_2$ or Sr(OH)$_2$, and a hydroxide of the ion (b), e.g., Pb(OH)$_2$ or Ba(OH)$_2$, or an aqueous solution by properly dissolving a salt of the ion (a) such as CaCl$_2$, CaBr$_2$, SrCl$_2$, SrBr$_2$ or the like and a salt of the ion (b) such as PbCl$_2$, PbBr$_2$, BaCl$_2$, BaBr$_2$ or the like, mixing said aqueous solution with a particulate sulfonated porous styrene-divinylbenzene copolymer or a salt thereof, filtering the mixture, and further repeating the above operation. Said packing material can also be obtained by packing a particulate sulfonated porous styrene-divinylbenzene copolymer or a salt thereof in a column or placing it on a funnel and passing the above-said aqueous solution therethrough.

The sulfonated porous styrene-divinylbenzene copolymer particles can be produced by a known method. For example, such copolymer particles can be obtained by suspension polymerizing divinylbenzene and a styrene monomer in the presence of a water-insoluble organic solvent such as amyl alcohol, toluene or the like, isolating the produced particles, swelling them with a swelling agent such as dichloroethane, trichloroethane or the like, and adding thereto concentrated sulfuric acid or chlorosulfuric acid to effectuate a sulfonation reaction at room temperature to 120° C. The ion exchange capacity can be adjusted by properly controlling the reaction conditions at the time of reaction with concentrated sulfuric acid or chlorosulfuric acid. The porosity of the column packing material of this invention can be adjusted by properly selecting the reaction conditions, especially the kind and amount of the water-insoluble organic solvent used, at the time of suspension polymerization. The particle size can also be adjusted by properly selecting the suspension polymerization conditions.

In the above process, divinylbenzene is preferably used in an amount of 5 to 60% by weight based on the total weight of the reaction materials. The styrene monomer may be selected from those mentioned above, and in this invention, other monomers such as vinyl acetate, methacrylic acid, acrylic acid, etc., can be used in an amount not greater than 5% by weight based on the total weight of the reaction materials. When performing the suspension polymerization in the above process, a commonly employed polymerization initiator, for example a peroxide such as benzoyl peroxide, can be used.

It is desirable that said sulfonated porous styrene-divinylbenzene copolymer has an ion exchange capacity greater than 2 meq/g, preferably 3 to 5 meq/g.

In the column packing material according to this invention, it is desirable for obtaining a better separating performance that each of the porous styrene-divinylbenzene copolymer particles having a SO$_3^-$ group is possessed of both ion (a) and ion (b) as the counter ion of the SO$_3^-$ group. For example, the column packing material of this invention may be composed of: (A) porous styrene-divinylbenzene copolymer particles having Ca$^{++}$ or Sr$^{++}$ (ion (a)) as the counter ion of the SO$_3^-$ group, and (B) porous styrene-divinylbenzene copolymer particles having Pb$^{++}$ or Ba$^{++}$ (ion (b)) as the counter ion of the SO$_3^-$ group, said both types of particles (A) and (B) being blended such that the ion (a) to ion (b) ((a)/(b)) equivalent ratio will be in the range from ½ to 2/1. The content of SO$_3^-$ group in said polymer particles (A) and (B), copolymer composition, preparation of the copolymer particles and neutralization may be decided or accomplished in the manner described above.

It is desirable that both copolymer particles (A) and (B) be mixed as uniformly as possible and have the same particle size, particle porosity, swelling degree and SO$_3^-$ group content. For this purpose, it is preferred to use the sulfonated porous styrene-divinylbenzene copolymer particles of the same lot and to neutralize the particles by the method described above. The copolymer particles (A) and (B) are preferably blended such that the (A)/(B) ratio by volume will be within the range from ½ to 2/1 as such blend can best facilitate the mixing operation.

In the column packing material of this invention, it is desirable that said both ions (a) and (b) be allowed to exist (as counter ion of SO$_3^-$ group) uniformly distributed in each of the porous styrene-divinylbenzene copolymer particles having SO$_3^-$ group. To this end, the column packing material of this invention is preferably produced by neutralizing the sulfonated porous styrene-divinylbenzene copolymer particles with an aqueous solution in which (c) at least one compound selected from the group consisting of Ca(OH)$_2$ and Sr(OH)$_2$ and (d) at least one compound selected from the group consisting of Pb(OH)$_2$ and Sr(OH)$_2$ are dissolved in a (c)/(d) molar ratio of from ½ to 2/1.

The neutralization of the sulfonated porous styrene-divinylbenzene copolymer particles with an aqueous solution of said compounds (c) and (d) can be accomplished by the following methods:

(1) The sulfonated porous styrene-divinylbenzene copolymer particles are dispersed in an aqueous solution in which the compounds (c) and (d) have been dissolved in an excess amount to the sulfone group, and the dispersion is stirred sufficiently.

(2) Said copolymer particles are packed in a column or placed on a funnel and the aqueous solution of said compounds (c) and (d) is passed therethrough to thereby effect an ion exchange.

In these methods, said aqueous solution is used in an amount enough to effectuate the ion exchange to a desired degree, but the concentration of the aqueous solution and other matters need not be specifically defined.

The method (1) is preferred for uniformly distributing the ion (a) and ion (b) in the column packing material, and it is especially desirable that the sulfonated porous styrene-divinylbenzene and the aqueous solution of the compounds (c) and (d) be used in such amounts that the total amount of both ions (a) and (b) will be equivalent to the sulfone group. The sulfonated porous styrene-divinylbenzene copolymer particles used in the invention of the above-described process may be the same as those used in the invention of the column packing material described before.

Because the ion (a) and ion (b) differ in reactivity with the SO$_3^-$ group, the process of this invention is preferred to the other methods for having said both ions (a) and (b) distributed uniformly in the column packing material.

The column packing material according to this invention can be applied to high-speed liquid chromatographic analyses in which a sample is supplied from a sample inlet and passed through a column packed with said packing material while supplying an element thereto, and the material which has passed the column is detected by a detector and recorded on a chromatogram, and the chromatographic fractionation in which the sample is passed through a column packed with said packing material and the respective fractions are collected. In these separation methods, the column packing material of this invention does not serve as an ion exchange resin.

Preferable conditions at the time of analysis are column diameter 2.0–15 mm, column length 150–160 mm and a flow rate 0.1–2 ml/min. Preferable conditions at the time of dispersing are column diameter 10–50 mm, column length 300–600 mm, and a flow rate 1–10 ml/min. Further, two to four columns can be used in series. As eluent, water is preferable. As detector, there can be used conventional ones such as differential refractometers, light-scattering type detectors, etc.

Known methods may be used for packing the column packing material of this invention in a column, and it is especially preferred to pack the material in a slurry form under pressure.

The invention will be further described below by way of the Examples and Comparative Examples.

COMPARATIVE EXAMPLE 1

13.6 Grams of the sulfonated porous styrene-divinylbenzene copolymer particles having a particle size of 8–15 μm, an ion exchange capacity of 4.3 meq/g and a crosslinking degree (weight percent of divinylbenzene in the copolymer) of 10% were swollen with about 70 g of water to form a slurry, and 500 ml of an aqueous solution of 7.8 g of $Sr(OH)_2.8H_2O$ in water was mixed with said slurry and stirred for one hour. The mixing was made such that the sulfone group to $Sr^{++}$ equivalent ratio would become 1/1. The mixture was then filtered and washed with water to obtain a column packing material having an exclusive limit of 1,000. This column packing material was swollen with water to form a slurry and packed in a 8 mmφ×30 cm stainless steel column. This column was set in a high-speed liquid chromatographic analyzer, and a sample containing raffinose, maltose, glucose, galactose, mannose and fructose was analyzed thereby under the following conditions: flow rate, 1.0 ml/min; eluent, water; column temperature, 60° C., by using a differential refractomer as detector. The resultantly obtained chromatogram is shown in FIG. 1.

In FIG. 1, peak 1 is the joint peak of galactose and mannose, which indicates that these two sugars were not separated from each other. Peak 2 is that of fructose. Other peaks are those of raffinose, maltose and glucose as they appeared in this order on the chromatogram in accordance with elution time.

COMPARATIVE EXAMPLE 2

The process of Comparative Example 1 was repeated except that 9.2 g of $Ba(OH)_2.8H_2O$ was used instead of 7.8 g of $Sr(OH)_2.8H_2O$ to obtain a column packing material having an exclusive limit of 1,000. Mixing was made such that the sulfone group to $Ba^{++}$ equivalent ratio would become 1/1. Then, in the same manner as in Comparative Example 1, the obtained column packing material was packed in a column and the sample analysis was conducted by high-speed liquid chromatography. The result (chromatogram) is shown in FIG. 2.

In FIG. 2, peak 3 is that of galactose, and peak 4 is the joint peak of mannose and fructose, which signifies that these two sugars were not separated from each other. Other peaks are those of raffinose, maltose and glucose as observed in this order in accordance with elution time.

EXAMPLE 1

The column packing material obtained in the same way as in Comparative Example 1 and the column packing material obtained in the same way as in Comparative Example 2 were respectively swollen with water to form the slurries. After allowing them to stand overnight, the supernatant was removed from the respective slurries. 20 Ml of slurry was collected from each residual slurry, and the collected slurries were joined and mixed well. Thereafter, in the same manner as in Comparative Example 1, the obtained material was packed in a column and the sample analysis was conducted by high-speed liquid chromatography. The result (chromatogram) is shown in FIG. 3. Peak 5 is that of galactose, peak 6 is that of mannose, and peak 7 is that of fructose. They indicate that these three sugars have been separated from each other. Other peaks are those of raffinose, maltose and glucose which were eluted in this order at different time points.

EXAMPLE 2

A column packing material was produced in the same way as in Comparative Example 1 except that 3.9 g of $Sr(OH)_2.8H_2O$ and 4.6 g of $Ba(OH)_2$ were used instead of 7.8 g of $Sr(OH)_2.8H_2O$. Said compounds were blended so that the equivalent ratio of the total amount of $Sr^{++}$ and $Ba^{++}$ to the sulfone group became 1/1 and the $Sr^{++}$ to $Ba^{++}$ equivalent ratio also became 1/1. Then, in the same manner as in Comparative Example 1, the obtained packing material was packed in a column and the sample analysis was conducted by high-speed liquid chromatography. The result (chromatogram) is shown in FIG. 4. In FIG. 4, peak 4 is that of galactose, peak 5 is that of mannose and peak 8 is that of fructose. It is seen that these sugars have been separated definitely from each other. Other peaks are those of raffinose, maltose and glucose as they appeared in this order on the chromatogram in accordance with elution time.

A diagrammatical illustration of the apparatus used for the above analysis is shown in FIG. 5. The eluent stored in a container 11 is pumped up through a pipe 13 by a pump 12, passed through a column 14 and a detector 15 and collected in a container 16. The sample is supplied from a sample inlet 17 (through a three-way cock). A chromatogram recorder 18 is connected to the detector 15.

As is clear from the foregoing description, the column packing material according to this invention is suited for separating different kinds of sugars having the same molecular weight.

What is claimed is:

1. A liquid chromatographic column packing material comprising porous styrene-divinylbenzene copolymer particles having $SO_3^-$ group, said copolymer particles having as counter ion of said $SO_3^-$ group:
   (a) at least one kind of ion selected from the group consisting of $Ca^{++}$ and $Sr^{++}$, and
   (b) at least one kind of ion selected from the group consisting of $Pb^{++}$ and $Ba^{++}$
in an (a)/(b) equivalent ratio from ½ to 2/1.

2. The liquid chromatographic column packing material according to claim 1, wherein each of the pourous styrene-divinylbenzene copolymer particles having $SO_3^-$ group has as the counter ion of said $SO_3^-$ group both ion (a) and ion (b).

3. The liquid chromatographic column packing material according to claim 1 wherein the porous styrene-divinylbenzene copolymer particles are a mixture of
   (A) the porous styrene-divinylbenzene copolymer particles having $SO_3^-$ group and $Ca^{++}$ or $Sr^{++}$ (ion (a)) as the counter ion of said $SO_3^-$ group, and
   (B) the porous styrene-divinylbenzene copolymer particles having $SO_3^-$ group and $Pb^{++}$ or $Ba^{++}$ (ion (b)) as the counter ion of said $SO_3^-$ group, the (a)/(b) ratio (equivalent ratio) being in the range from $\frac{1}{2}$ to 2/1.

* * * * *